United States Patent [19]
Martin

[11] Patent Number: 5,678,910
[45] Date of Patent: Oct. 21, 1997

[54] MULTIPLE ANGLE PROJECTION FOR 3-D IMAGERY

[75] Inventor: Donald Lewis Maunsell Martin, Mosman, Australia

[73] Assignee: Trutan Pty Limited, Mosman, Australia

[21] Appl. No.: 564,987

[22] Filed: Nov. 30, 1995

Related U.S. Application Data

[63] Continuation of Ser. No. 397,556, Mar. 2, 1995, abandoned, which is a continuation of Ser. No. 972,491, filed as PCT/AU90/00590, Dec. 13, 1990, abandoned.

[30] Foreign Application Priority Data

Aug. 8, 1990 [AU] Australia .................... PK1647

[51] Int. Cl.[6] .................................................. G03B 21/14
[52] U.S. Cl. ......................... 353/7; 359/478; 353/10
[58] Field of Search ........................... 353/7, 9, 10, 94; 359/462, 467, 475, 477, 446, 458, 478, 479; 348/42, 47, 48, 50; 352/86, 57, 61

[56] References Cited

U.S. PATENT DOCUMENTS

| 4,158,487 | 6/1979 | Collender | 352/86 |
|---|---|---|---|
| 4,319,805 | 3/1982 | Nicolas | 359/446 |
| 4,431,280 | 2/1984 | Carvelo | 352/61 |
| 4,943,851 | 7/1990 | Lang | 359/446 |
| 4,983,031 | 1/1991 | Solomon | 353/10 |
| 5,082,350 | 1/1992 | Garcia et al. | 359/446 |
| 5,148,310 | 9/1992 | Batchko | 359/462 |

Primary Examiner—William Dowling
Attorney, Agent, or Firm—Abelman, Frayne & Schwab

[57] ABSTRACT

The method and apparatus function to form three-dimensional imagery on plural screen surfaces (2) which are formed by changing planes of imagery. One or more projectors (4) project a plurality of images onto the screen surface from a common axis. The planes of imagery on the screens (2) which are projected by said one or more projectors (4), change at such a speed that, to the eye, the images appear simultaneously in three-dimensional form on said screen surfaces (2).

7 Claims, 9 Drawing Sheets

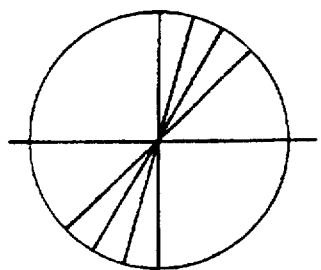
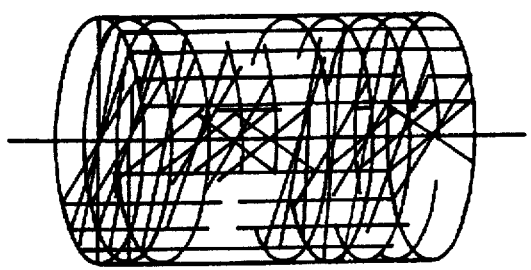
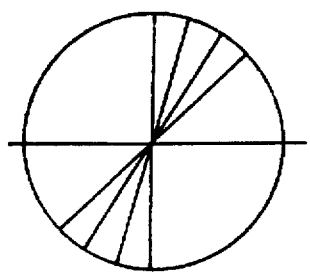
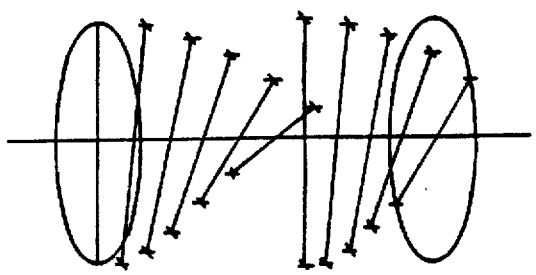
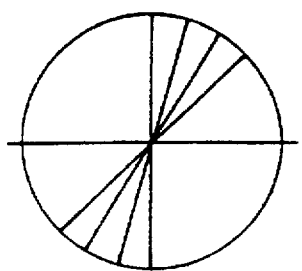
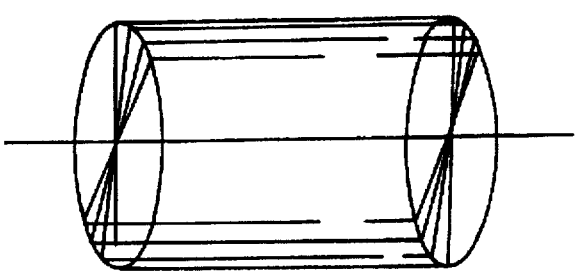
FIG.9

MULTIPLE ANGLE PROJECTION FOR 3-D IMAGERY

This application is a continuation application under 37 C.F.R. 1.62 or prior application Ser. No. 08/397,556, filed on Mar. 2, 1995, now abandoned, which is a continuation of Ser. No. 07/972,491 filed as PCT/AU90/00590, Dec. 13, 1990, now abandoned.

FIELD OF THE INVENTION

The present invention relates to a method and apparatus for use in the creation of three-dimensional imagery.

PRIOR ART

Up until this time, three-dimensional imagery has essentially been produced with viewers that present different aspects of objects to each eye and usually with filtered, polarised or oscillating imagery that is observed through filtered, polarised or oscillating viewers or spectacles. Lenticular arrays, static or dynamic double image strips and viewing slots arrangements also attempt a similar effect without the use of such viewers or spectacles. Further, holograms produce three-dimensional imagery but by an entirely different approach that records multiple images of a view through the interaction of light waves on film. Further, it is known to provide combinations of these various systems.

Image depth enhancement, which is often referred to a three-dimensional imagery, is produced in a number of known ways. These include using dynamic lenses; dynamic mirrors; increasing comparative image size substantially; increasing image definition; using curved mirrors; lenses; fresnel screens and lenses; frames that obscure the borders of the image; signal changing devices that fluctuate dimensions of the image; and placing layers of transparent material (such as glass or perspex) immediately over the surface on which the image appears.

Despite the number of methods and means previously investigated and used none of these depth enhancing devices produces three-dimensional imagery, although some can produce significant improvements in both appearance of depth and realism.

The use of systems which depend on viewers, spectacles, lenticular arrays, image strips and viewing slots, produce an illusion of three-dimensions by partially stimulating normal eye function. In each, two similar but different views are presented, one to the left eye and one to the right eye. The distinctions between these two views are determined by the angle between two viewing positions; this approximates the distance between human eye pupils. Left eyes see aspects left of right eye aspects; right eyes see aspects that are right of left eye aspects. These systems of means of viewing make it impossible for either eye to see both views simultaneously. The two images presented in such a manner combine in the brain through a physiological process analogous to normal vision perception.

Opticals using the principle of producing two distinct views to simulate perceptions of three dimensions are limited by inherent restrictions. Such restrictions confine such systems and means to representations of three dimensions in single horizontal planes, with fixed field depth and fixed focal length. In practice, such system are precluded from replicating normal perception of three dimensions accurately or completely.

It will be appreciated that the human eyes set both horizontal and vertical planes substantially simultaneously, together with constantly varying field depths and focal points. This dynamic sensing, coupled with memory, maintains impressions of infinitely variable views of everything seen by the eyes. Three-dimension imagery, of the two separate views type, is not capable of producing visual realism as people are used to experiencing it. It is always distinguishable as imagery and unnatural. Further, there are other drawbacks with this approach. Such drawbacks include limitations on the angles of which imagery can be seen; incompatibility with conventional equipment; difficulties with transmission and broadcasting; sub-standard quality; small size; eye strain; lack of commercial viability and problems with many people who have abnormal vision.

Unlike the other previous systems, holograms do not require viewers, spectacles or other intermediate opticals. Further, holograms produce multiple views of recorded objects. Again however, such holograms have severe limitations. Currently holograms with the capacity to display three-dimensional imagery cannot be acquired by laser or electrical, recording or storing equipment. Further, such holograms cannot be transmitted, broadcast or displayed on video or television screens. Holograms can, in some cases, be used to produce cinematography but costs preclude realistic commercial viability. Hologram displays are often encumbered further by limitation in viewing positions.

For the reasons set out above, three-dimensional imagery is not widely used despite significant attempts at improvements.

It is an object of at least one preferred embodiment of the present invention to go at least some way towards overcoming or minimising the problems referred to above and provide an efficient and viable method and apparatus for producing three-dimensional imagery.

It is a further object of at least one preferred embodiment of the present invention to provide an efficient method and arrangement for use in the production of three-dimensional imagery.

Other objects of this invention will become apparent from the following description.

DISCLOSURE OF THE INVENTION

According to one aspect of this invention there is provided a method for the creation of three-dimensional imagery, comprising so projecting a plurality of images from different angles and about a common centre, such that said images are displayed substantially simultaneously at substantially corresponding angles and at a speed such that, to the eye, they appear to be simultaneous and in three dimensions.

According to a further aspect of this invention there is provided a method for the creation of three-dimensional imagery on at least one screen surface, comprising projecting one or more images at said screen surface from a plurality of angles about a common centre and spaced apart from said screen surface, such that said images are displayed on said screen surface at substantially corresponding angles, and so as to appear simultaneously to the eye.

According to a further aspect of the invention there is provided a method for the creation of three-dimensional imagery on at least one screen surface, formed by and comprising a plurality of changing planes about a common centre; comprising projecting one or more images at said screen surface from a plurality of angles; such that said one or more images are displayed on said screen surface at substantially corresponding angles; said planes of at least one screen surface changing at such a speed and said one or more images being so projected that, to the eye, said one or more images appear simultaneously and in three-dimensional form on said at least one screen surface.

According to a further aspect of this invention there is provided a method for producing three-dimensional imagery on at least one screen surface formed by and comprising a plurality of changing planes of imagery about a common centre; said method comprising projecting one or more images at said screen surface from a plurality of angles spaced from and about said screen surface and about a common centre; the arrangement being such that said one or more images are displayed on said screen surface at substantially corresponding angles; said planes of imagery changing at such a speed, and said one or more images being so projected, that to the eye, said one or more images appear simultaneously, in three dimensions and with volume in space, on said screen surface.

According to yet a further aspect of this invention there is provided an arrangement for use in creating three-dimensional imagery, comprising at least one screen surface including or formed by a plurality of changing planes; means being provided for projecting one or more images at said screen surface from a plurality of angles spaced from said screen surface and spaced about a common centre; means being provided whereby the planes of said screen surface are changed at such a speed, and said one or more images are so projected at said a speed, and said one or more images are so projected at said screen surface, that said one or more images appear, to the eye, simultaneously and in three-dimensional form on said screen surface.

The three-dimensional imagery produced according to the present invention can be applied to enhance the realism and appeal of recorded, printed, projected, transmitted and broadcast imagery. Further, in one form, the present invention will go at least some way towards increasing the quality and quantity of information presented by most forms of imaging equipment. Examples are three-dimensional cinematography; three-dimensional television; three-dimensional telecommunications displays; three-dimensional data processing displays; three-dimensional entertainment displays; three-dimensional diagnostic and monitoring equipment; fire, security, weapons and sensor control displays; three-dimensional sign displays; three-dimensional training and instructional displays; three-dimensional displays for simulators, toys, clocks, equipment and vehicle control, drafting design and imaging equipment.

BRIEF DESCRIPTION OF THE DRAWINGS

The present invention will be described with reference to various embodiments of the invention, with reference to the accompanying drawings, which illustrate a plurality of forms of the invention, described by way of example only. The various forms of the present invention are described by way of example only in the accompanying diagrammatic drawings in which:

FIG. 9 is a further diagrammatic view of one form of the present invention.

Figure 1:
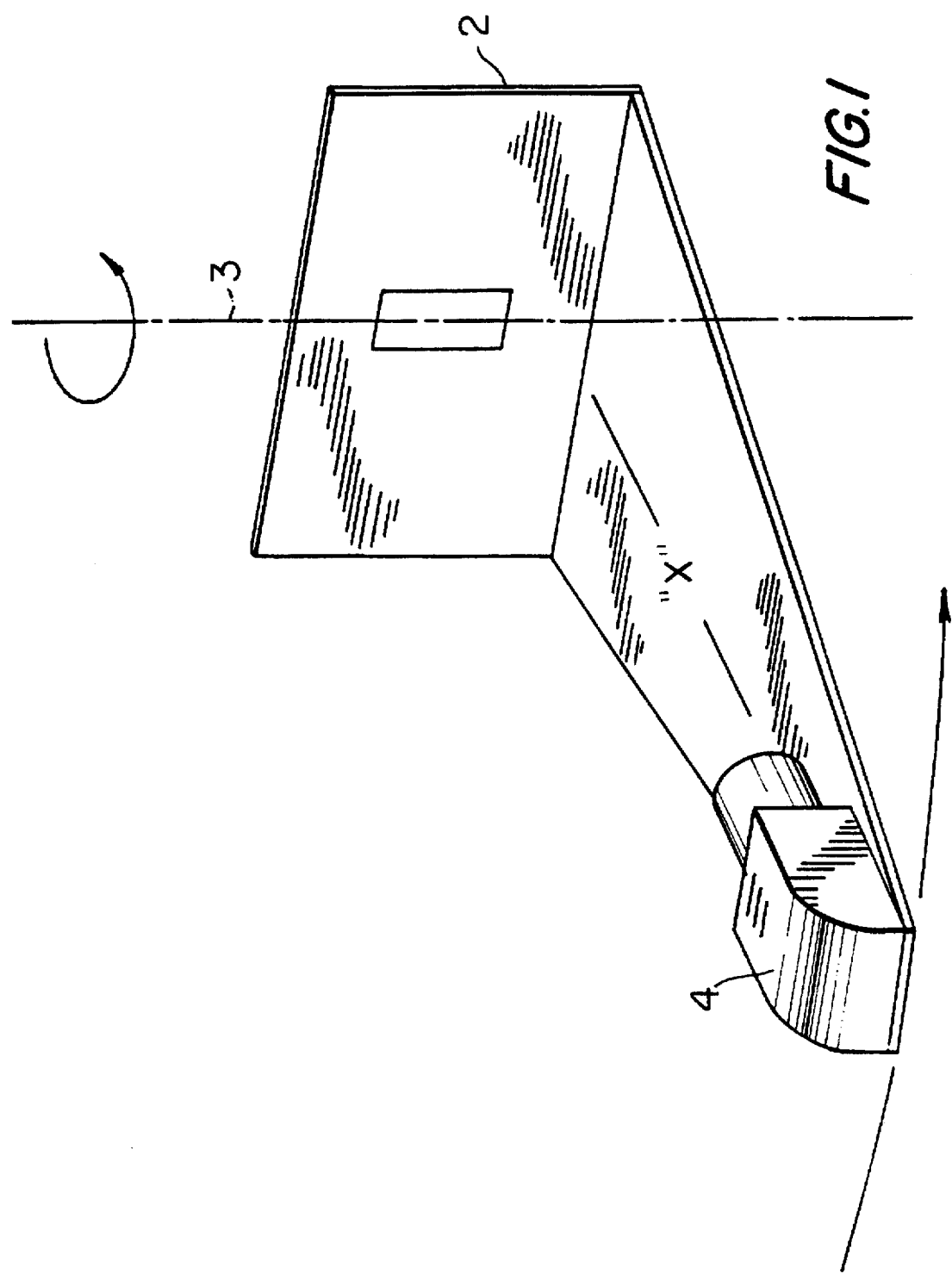
FIG. 1 is a diagrammatic view of one preferred form of the invention.

It should be appreciated that the present invention is described with reference to the accompanying drawings, by way of example only, and that improvements and modifications may be made to the invention and to the various forms of the inventions described and illustrated by way of example, without departing from the scope or spirit of the invention.

DESCRIPTION OF THE PREFERRED EMBODIMENT OF THE PRESENT INVENTION AND BEST MODES OF CARRYING OUT THE INVENTION

The various forms of the present invention provide methods and means by which imagery can be produced in three-dimensional form and space. The imagery created by the method and means of the present invention, have dimensions of height, width and depth, but can be measured on three axes, at right angles relative to each other. The imagery created is three-dimensional because it has and occupies three real dimensions. It is therefore distinct from other known systems and systems for producing so-called three-dimensional imagery. Such known arrangements produce impressions or give the appearance of three-dimensional imagery but do not do so satisfactorily and cannot produce imagery that actually exists in space and provides volume in space to the eye.

Imagery of the present invention including multiple angle views from about a common centre, acquired substantially simultaneous to the eyes.

For use in film or video imagery, the common centres about which multiple angle views are acquired, may change sequentially, thus producing multiple angle views, with common centres of the multiple angles changing speeds appropriate to recording and producing movement in the imagery objects.

The present invention uses a screen surface which is formed by and comprises a plurality of changing planes of imagery about a common centre. This will be described hereinafter by way of example. Further, such a screen surface used in forms of the present invention, to provide three-dimensional imagery, can be defined as a point where light forms changing planes to thus provide and form such a screen surface. By way of example, in the case of the use of laser beams, such screen surface can be formed where beams or projected beams of light from laser beams change planes. In a further example, using liquid crystal displays, such a screen surface can be formed where light from the liquid crystal displays forms changing planes. These are however by way of example only. It is however considered appropriate to define the term screen surface as being a screen surface formed or provided at a point where light forms changing planes.

In the present invention, the three-dimensional imagery is presented on screening surfaces; within plasma displays; from liquid crystal displays; from galenium arsenide displays; from displays produced with crystaline, liquid or gaseous components that have electro-optical qualities (particularly non-linear electro-optical qualities); from phosphor screen displays; from screens produced with chemicals functioning similarly to phosphors as controllable light emitting pixels; from holographic displays; or with intersecting lasers, take-up volume in space within which imagery is produced with height, width and depth.

In the preferred forms of the invention, and within the screening, or imaging, volume, multiple angles of view, from a common centre, acquired substantially simultaneously, are produced at the same multiple angles of view at speeds that appear simultaneous to the eyes.

For use in film or video imagery, the common centre around which the multiple angle views are acquired substantially simultaneously (so as to appear simultaneous to the eye) change at speeds appropriate to the production of movement in the imagery objects.

When screen surfaces are used to present the imaging, the screening surfaces change position and move about a common axis, in each plane required, through all angles at which imagery was acquired, or intended to be presented. The screen may be a screen, partial screen, or a combination thereof, that move such as rotate, oscillate, pulse, or vary, or otherwise move continuously within and throughout a space equivalent in height, width and depth to the dimensions of the imagery.

The three-dimensional imagery produced by the present invention may be corrected as necessary for keystone or other distortions, and is produced on a screening surface or surfaces, as the surface or surfaces move or traverse within the space in which the imagery is illuminated. This provides that all angles of view appear clearly, the angles of view changing position with sufficient speed to ensure that different angles of view appear to persist throughout the imagery, so that at all times objects appear in proportional, actual or appropriate height, width and depth and at more than one aspect.

Three-dimensional imagery of this type, according to the present invention, may be produced mechanically by fixing a slide, film or video projector and a screen so that the positions of the projector and screen remain constant, thus maintaining a fixed focal length between the projector and screen, while the projector and screen move together; for example, rotate, reciprocate, or oscillate together about a horizontal and/or vertical plane. In this way imagery projected on to the screen will appear throughout the space traversed by the screen, producing a visual object with three real dimensions.

Referring to FIG. 1 of the accompanying drawings, a screen 2 is seen as being mounted for rotation about the vertical axis 3, a projector 4 being mounted spaced apart from the screen 2, but being so mounted relative to the screen (such as for example on a track, a rotating plate, or the like) so that on operation at the projector 4, the one or more images projected therefrom will be projected onto the screen 2. Appropriate drive means are provided to cause both the screen 2 and projector 3 to rotate together in a horizontal plane, essentially about the vertical axis 3. This fixed focal length "X" between the screen 2 and projector 4 remains constant and the projector and screen rotate together. The rotation between the screen 2 and projector 4 is synchronised in an appropriate manner, such that the rotation is at such a speed that the images being projected on to the screen 2, appear on the screen 2 with three real dimensions.

In one form of the present invention, a single projector can be mounted at a desired angle and focal length from and relative to a screen surface having a plurality of moving planes. Images are able to be projected at said screen (such as by using video tape or film), such images having been taken and captured on tape or film from a plurality of different angles. The projecting of such images onto said screen surface, from about a common centre, allows said images to be seen from a plurality of angles (such as from which they were captured on tape, film or the like), substantially simultaneously and so as to appear to the eye simultaneous and in three dimensions. Referring by way of example to FIG. 1 of the accompanying drawings, the projector 4 can be fixed relative to the screen surface 2 which in such a form of the invention rotates about a vertical axis 3. It will however be appreciated, that the screen surface 2 can move, oscillate or rotate about both horizontal and/or vertical axes. Further, it will be appreciated that the screen surface can be defined as being formed at any point where projected light forms changing planes.

Figure 2:
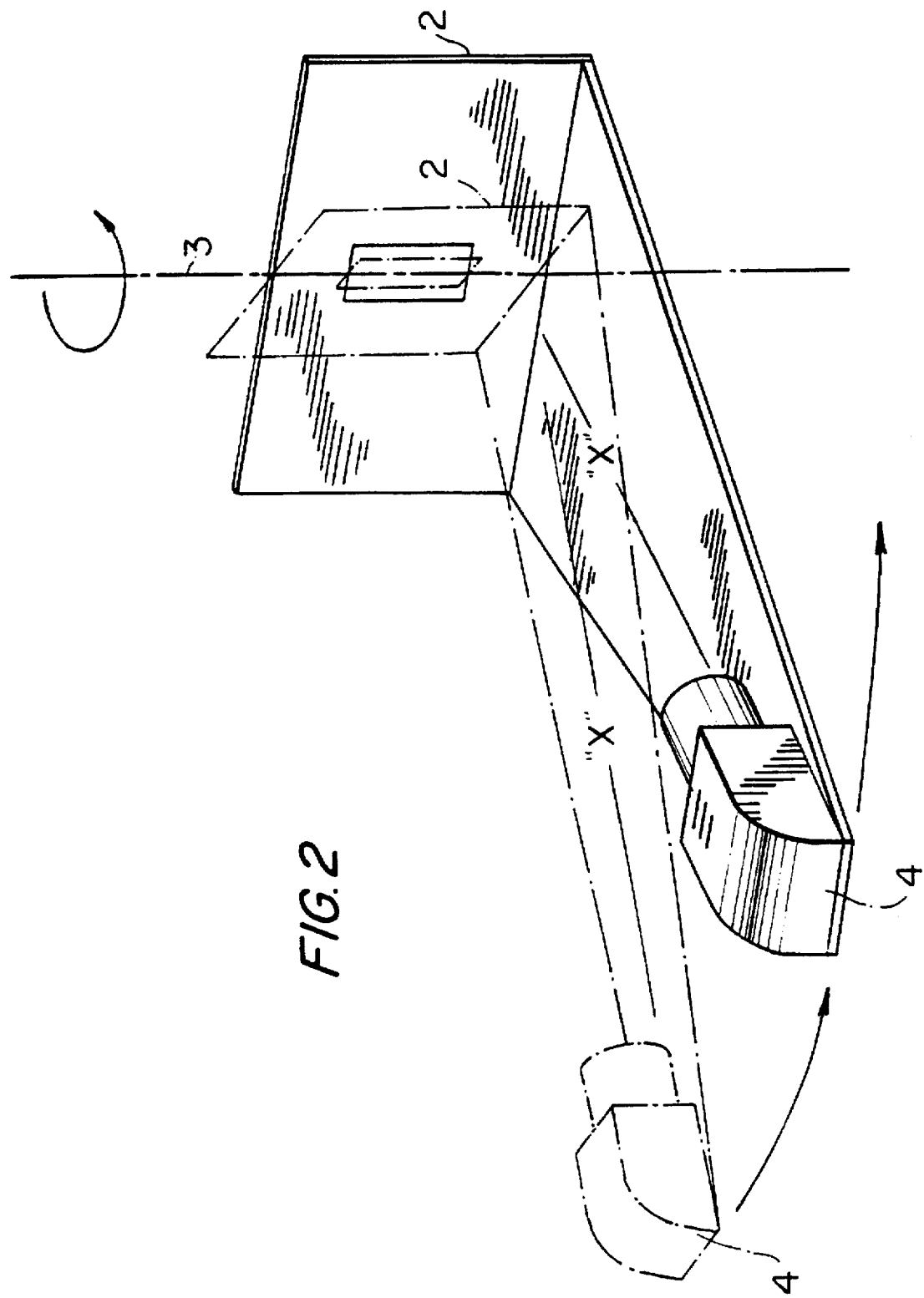
FIG. 2 is a diagrammatic view of a further form of the invention.

FIG. 2 of the accompanying drawings shows a further form of the invention shown in FIG. 1 of the drawings, wherein the imagery projected from projector 4 contains an angle of a view of an object so that the imagery on the screen 2 appears at one position on the traverse of the moving screen 2, this permitting the display of that angle of view of the object in a selected position.

Figure 3:
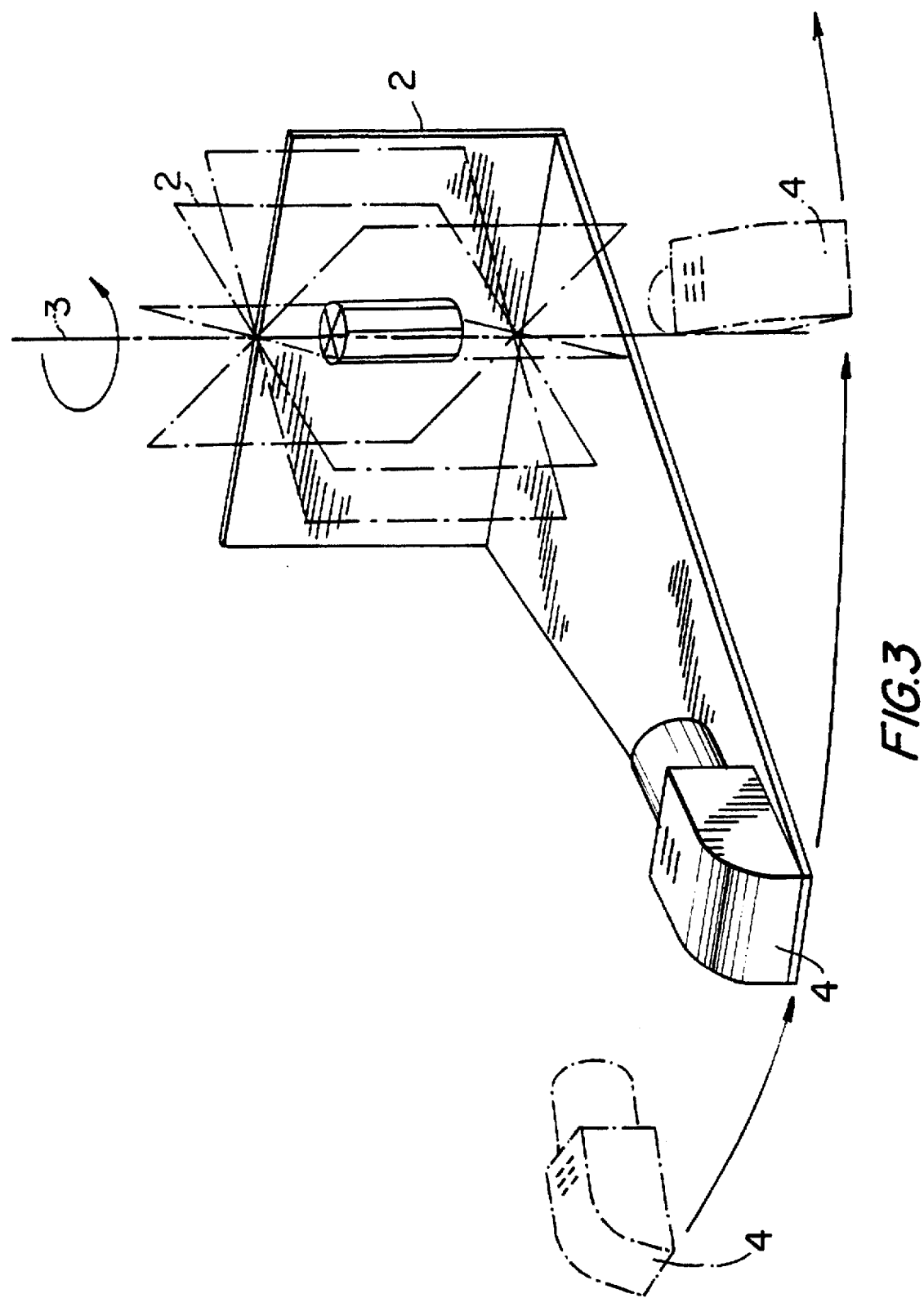
FIG. 3 is a view of a further form of the present invention.

Referring to FIG. 3 of the accompanying drawings, this shows the screen surface 2 rotating about the vertical axis 3, wherein the projector 4 projects a sequence of stationary imagery, containing different, compatible, contiguous angles of view of an object, at different positions on the traverse of the moving screen, so that the imagery appears stationary; with each angle of view coherently related to the others, according to the relationship of the angle of view to the object, the screen surface 2 will display an angle of view of the object equal to the total number of angles of views.

In a further form of the invention, and with reference to FIG. 3 of the drawings, a sequence of compatible, contiguous, stationary imagery (containing multiple angles of view of an object) are projected at different positions on the traverse of the moving screen 2, consistent with the shape of the object, and for example taking up every possible position on the traverse of the screen. This allows of the screen to present and display different angles of view of the object from every position from which the screen is observed, and thus permits multiple angles of the object to be displayed and viewed.

It should be appreciated that in certain forms of the invention one projector 4 can be mounted at a position spaced apart from the screen surface and at a predetermined angle relative thereto, the screen surface 2 being mounted for rotation about a substantially vertical axis and being connected to appropriate drive means for this purpose. At the same time, one or more projectors 4, at one or more angles relative to the screen 2 are mounted on a rail, plate or platform which is also adopted to rotate in a horizontal plane substantially about the vertical axis 3, so that the screen surface 2 and one or more projectors 4 will rotate together in the manner hereinbefore described, this bringing about the production of three-dimensional imagery on the screen surface 2.

As referred to hereinbefore, and as will be described with reference to further forms of the present invention, three-dimensional imagery of the present invention may be produced by moving one or more projectors and a screen surface together (as described by way of example with reference to FIGS. 1 to 4 of the accompanying drawings, or alternatively by having one or more projectors fixed at a set focal length between projector and screen, while the screen surface rotates or oscillates or otherwise moves (as will be hereinafter described).

It has been found that the extent to which one or more objects appear to be solid on the screen surface, will depend upon the speed at which the screen surface moves. Where, as in forms of the invention described with reference to FIGS. 1 to 4 of the accompanying drawings, the screen surface rotates, it has been found that such rotation should be at a speed of up to 60 rotations or oscillations a second, although such movement should be at least, in the preferred form of the invention, 24 rotations or oscillations per second.

It has been found that in preferred forms of the invention, shuttering the projector at sufficient speed, so that the imagery appears stationary at a position or positions on the paths traversed by the screen surface, product static imagery at that or those positions.

It should be appreciated that where the screen surface and one or more projectors are to move together (such as to rotate together as described with reference to FIGS. 1 to 4 of the accompanying drawings) the rotation of the screen surface and one or more projectors is synchronised by using appropriate synchronising means so that drive means operating the driving of the screen surface and one or more projectors, will be synchronised in an appropriate manner.

It should also be appreciated that as referred to hereinbefore, a screen surface can rotate about a vertical axis while at the same time moving or rotating through a horizontal axis.

Figure 4:
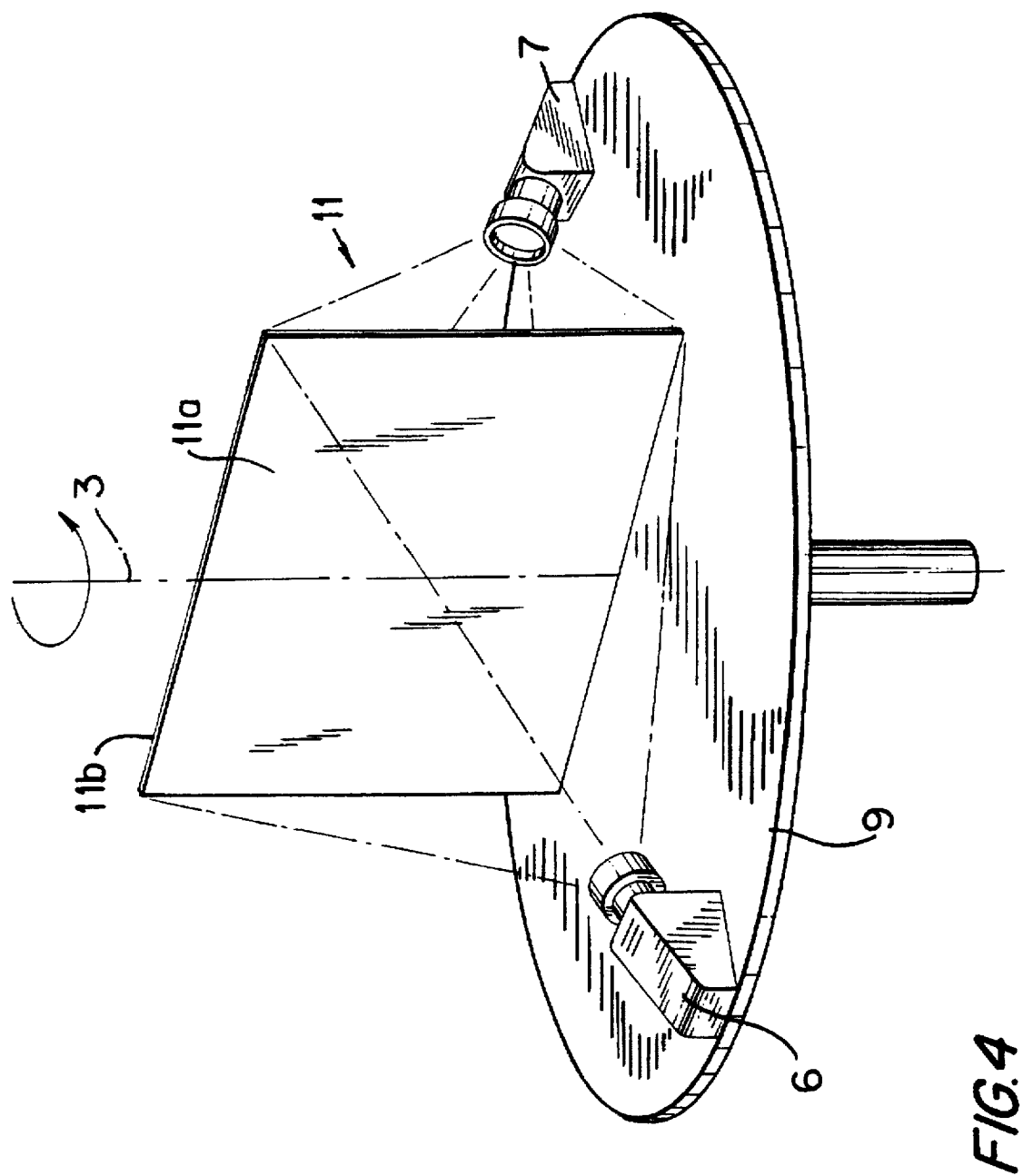
FIG. 4 is a diagrammatic view of a further form of the present invention.

Referring now to FIG. 4 of the accompanying drawings, this shows a further form of the present invention wherein two projectors 6 and 7 are mounted on a track or turntable 9 adapted for rotation in a substantially horizontal plane about a vertical axis 3, the projectors 6 and 7 being mounted about the circumference of the plate 9, so as to be substantially diametrically opposed one to the other, a double sided screen 11, with screen surfaces 11A and 11B being mounted on a substantial centre line of the plate or turntable 9, at substantially right angles to the projectors 6 and 7 and extending therebetween.

The screen surfaces 11A and 11B are preferably identical in size and shape, and are edge matched back to back with a minimal distance between the two screen surfaces 11A and 11B. The projectors 6 and 7 are mounted to maintain equal distance and equal heights at right angles to the vertical and horizontal planes of the screens 11A and 11B, in line with the diagonal centre points of each screen.

The rotation of the turntable 9 produces screen surfaces at every vertical plane, and by projecting imagery on to the screen surfaces 11A and 11D from the projectors 6 and 7, imagery is produced on all vertical planes at which imagery is projected during rotation.

It has been found that bright imagery requires relatively strong light sources on both projectors 6 and 7, and rotation speeds of at least 1440 r.p.m. are required to reduce perception of equipment movement to acceptable level. Rotation speeds of 3600 r.p.m. are required to make equipment motion invisible to the eye.

Wherever practical, componentry should be painted a dark colour or matt black as best results are obtained when there is no other illumination except from the projectors.

By projecting shuttered images with identical angles of view of objects on both screens, stationary imagery of the objects will be produced at any angle at which the imagery is projected. Projecting stationary contiguous, compatible different angles of view of objects at different, contiguous positions, corresponding to the order of the angles of view of the objects projected, will produce angles of view of objects equivalent to the total of all angles projected.

Projecting angles of view of the object totalling 360 degrees at corresponding positions on the screen will produce views of the object from every position from which the screen can be seen.

It should be appreciated that in the present invention, the quality of both imagery and three-dimensional imagery, depends upon the accuracy with which the projected imagery has been recorded, the accuracy with which the projected imagery is registered on the screens and the accuracy with which the equipment is aligned and balanced. Producing three-dimensional imagery composed of angles of view of objects to represent those objects, requires that the differences between adjacent angles should be small. By moving or rotating the screen about a horizontal centre point at the same time the screen is rotating on the turntable, produces a screen with rotating horizontal as well as vertical planes.

Further, shuttering and/or pulsing the projectors produces a facility for projecting angles of view recorded in both vertical and horizontal planes, and three-dimensional imagery from every point of observation.

Figure 5:
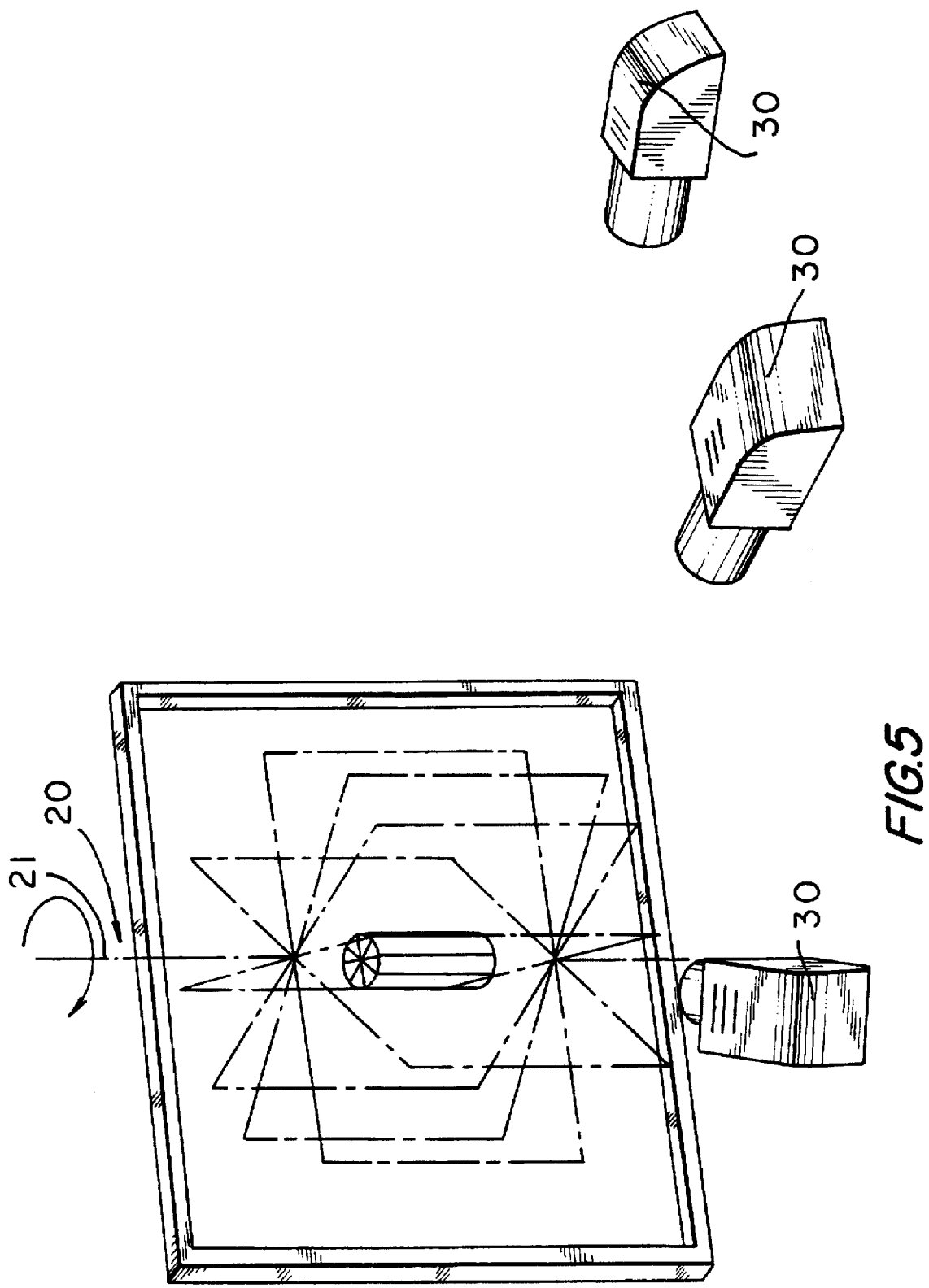
FIG. 5 is a diagrammatic view of yet a further form of the present invention.

Referring now to FIG. 5 of the accompanying drawings, this illustrates a form of the invention which could perhaps be used for successful experimentation, demonstration and teaching. This form of the invention includes a rotating screen 20, the screen rotating about a vertical axis 21, and the screen 20 preferably being double-sided to minimise light loss. The two sides should be of the same size and shape, and each matched back to back.

Imagery projected on to the screens will appear at all positions, 135 degrees right and left of any projector from which the screens can be seen. One or more projectors 30 can be provided and fixed about a centre point and about and relative to the screen 20.

In one form of the invention, keystone or distortion is preferably corrected by projecting each original angle of view onto a screen at the opposite angle to which the angle was acquired; thereafter photographing or otherwise recording that angle with a keystone produced at the mid-angle position. Projecting the keystone angle, at the screen positions for the original angle of view, averages the keystone produced of it at the opposite angle of projection, by opposite keystone effect, this producing a partially keystone corrected angle of view at that angle of the screen. The printing of keystone averaged angles of view onto a continuous film, and thereafter projecting the imagery onto a rotating screen from a film or video projector with the projection of separate angles of views synchronised with corresponding positions of the screen, permits production of a total angle of view of 270 degrees from one film projector or video projector. The smaller the angles of view acquired, the smaller the keystone. The faster the projector and the faster the screen rotation or movement, the smaller the angle that can be projected. Pin registered film cameras and pin registered projectors produce the best results.

Video projectors can be adapted to correct the keystone by producing an equal and opposite keystone to that produced by the screen rotations, progressively; allowing any angle of view to be projected keystone corrected, or any number of angles of view to be projected substantially keystone corrected.

In a further form or adaptation of the present invention, tolerable imagery for experimentation and demonstration can be provided by acquiring imagery with small differences in angles of view around a common centre.

Thus, the objects appearing in the imagery should be stationary, and each set of angles comprising a view from one distinct position should be acquired substantially simultaneously.

The recorded imagery is projected from projectors around the revolving screen, on other screen surface with changing planes, at angles apart, equivalent to the angles of view acquired for projection, and each projector is preferably shuttered so only one angle acquired for projection is projected onto the revolving screen from each projector.

It should be appreciated that keystone correction can occur and be carried out, at least partially, by shuttering and pulsing. Thus the one or more projectors concerned can be shuttered or pulsed as appropriate, the shuttered or pulsed projectors projecting each angle acquired simultaneously, or in sequence, as the screen moves, in synchronisation with angles of the screen to each projector. It should be appreciated that the smaller the angle projected at any one instant, the smaller the keystone distortion.

Figure 6:
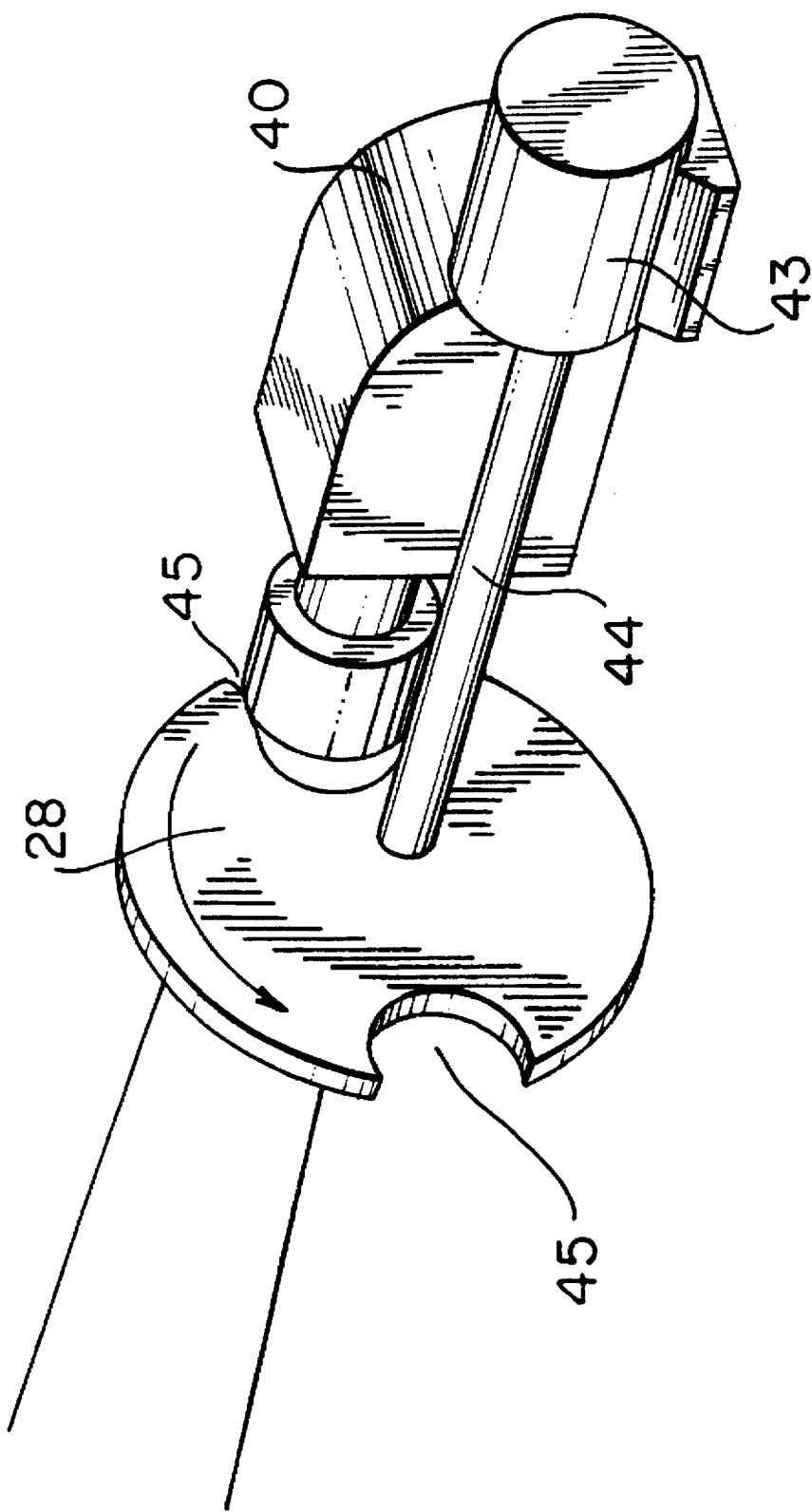
FIG. 6 is a diagrammatic view of componentry according to one form of the present invention.

Referring to FIG. 6 of the accompanying drawings, a projector 40 is shown provided with an appropriate shuttering mechanism 41, including a rotating plate 28, driven by a drive mechanism 43 and shaft 44, the shuttering plate 42 being provided with indents or recesses 45 above the circumference thereof, so that on rotation of the plate 28, the recesses or indentations 45 will move into and out of register with the projector 40, thus shuttering same. It will be appreciated that the operation of the shuttering mechanism described by way of example only with reference to FIG. 6 of the drawings is synchronised with the angles of the screen relative to each projector 40.

It should be appreciated that in forms of the invention using one or more screen surfaces, which rotate or move about one or more axes, it is desirable, in preferred forms of the invention, that the screens be properly balanced and constructed, given that the rotation of such screens at high speed generates substantial force which can be dangerous if the screens are not well constructed and balanced. It is also desirable although not essential that the screens be relatively small.

In a further form of the invention, and by way of example only, one or more rotating screens can be provided and mounted in an appropriate tube such as a vacuum tube, alternatively can be fabricated from light-weight material and contained in a tube or vacuum tube which will provide a 360 degree angle of three-dimensional imagery.

It will be appreciated in the forms of the invention described hereinbefore, with reference to the accompanying drawings, that one or more projectors are provided about a common centre, either fixed or mounted for rotation with one or more screens, so as to project images onto a screen surface from a plurality of angles about the screen surface. It will also be appreciated that the screen surface or surfaces can rotate with or relative to the one or more projectors, about vertical and/or horizontal axes. It should also be appreciated that other means of movement such as oscillation and the like can be applied to the screen surfaces which are defined as being formed by and comprising a plurality of changing planes of imagery.

It is also to be appreciated that according to the present invention, imaging systems can utilise screening surfaces such as for example plasma displays or intersecting laser light systems, the screen surface, in such laser light systems involving moving and intersecting laser lights, being defined at that point where light forms changing planes.

In such plasma display and intersecting laser light applications, imagery is formed containing substantially simultaneously acquired multiple angle projections from about a common centre, within volumes having dimensions corresponding substantially to the imagery and objects shown.

Figure 8:
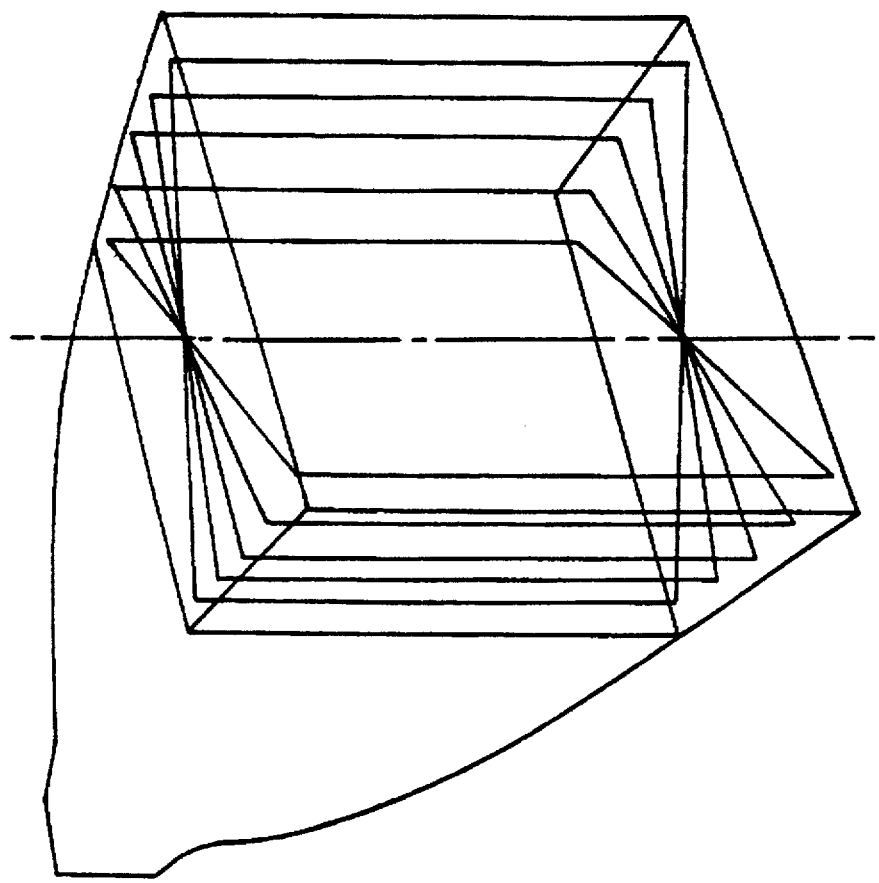
FIG. 8 is a diagrammatic view of a further form of the present invention.
Figure 7:
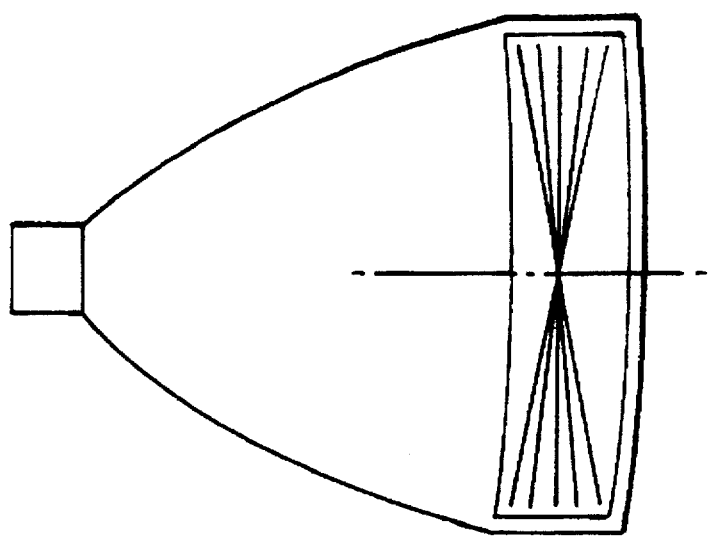
FIG. 7 is a view of a further form of the present invention.

In further forms of the invention, video tube adaptations of the inventions include electron gun and phosphor screen arrangements where the phosphor or similar electronically excited chemical, and the electron gun or guns or similar system or systems, for exciting chemicals to illuminate, produce imagery at different angles or positions around a common centre, at a sufficient speed to appear simultaneously as continuous, coherent, three-dimensional images, such an arrangement being shown by way of example only with reference to FIGS. 7 and 8 of the accompanying drawings.

In such forms of the present invention, the phosphors, or similarly functioning compounds, will illuminate imagery planes at angles around a common centre, switching on and off at a speed sufficient to appear as though each angle of imagery is being constantly displayed, this giving the image of being simultaneous to the eye.

In addition, the separate planes of imagery would contain small angles of view so that each angle of imagery appears substantially contiguous, continuous and indistinguishable within the total angle of view presented.

Phosphors, or similar chemicals functioning as controllable, coloured light emitting pixels, will be transparent when not energized to permit phosphors positioned behind or to the side, to be seen when illuminated. In addition, the phosphors or similar elements would have comparatively fast ignition and cooling rates, so that as angles change, glow or "trails" from phosphors cooling in adjacent planes do not obscure or interfere with any other plane of phosphors being illuminated at any instant.

Correct keystone-free alignment and placement of each angle of imagery would be controlled by a video producing unit, transmitter, recorder or receiver, or any combination of signal instigating and receiving sources depending on convenience.

Figure 10:
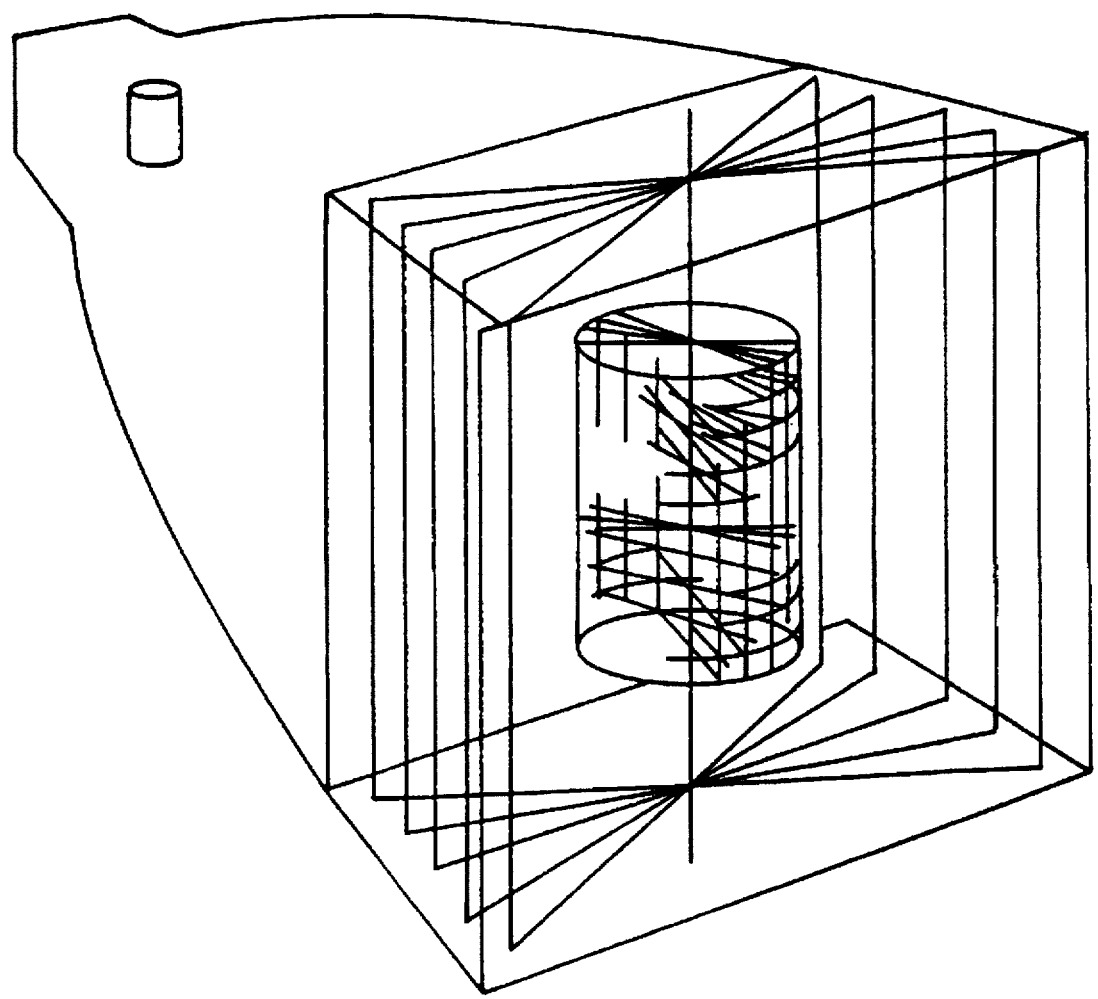
FIG. 10 is a further diagrammatic view of one form of the present invention.

A further adaptation of the invention, by way of example, and with reference to FIGS. 9 and 10 of the drawings, consists of a video tube where lines of illuminating phosphors or similarly functioning chemicals are fixed and parallel to the horizontal planes and at different positions on the vertical plane contained within the column of parallel lines which are at a variety of angles around a common vertical centre. Illuminating phosphors or similarly functioning chemicals illuminate at points and parallel vertical planes in sequence, so that only illuminating phosphors or similarly functioning chemicals in parallel vertical planes, illuminate at any one time to display an angle of view at that same time about the common centre of the parallel planes.

Changing the planes in which the illuminating phosphors or similarly functioning chemicals illuminate angles of imagery, in sequence, at speeds that appear simultaneous to the eyes, produces an angle of imagery around the common centre of the angles equal to the total of all the angles contained within each plane of the imagery displayed.

In addition to arranging the lines of illuminating phosphors, or similarly functioning chemicals, in parallel to the horizontal plane, the illuminating phosphors or similarly functioning chemicals can be fixed in parallel in the vertical plane and at different angles around a common centre at different positions on the horizontal length contained by the parallel rows of vertical lines. The vertical or horizontal common centre of the lines of illuminating phosphors, or similarly functioning chemicals, can be aligned at substantially right angles to the direction from which the display is viewed or aligned in the same direction from which the display is viewed.

As well as arrangements of parallel lines of illuminating phosphors, or similarly functioning chemicals, the lines can be arranged radiating from a centre points as axes of a spherical, hemi-spherical, partial spherical, conical or truncated conical volume.

As well as arrangements of lines of illuminating phosphors, or similarly functioning chemicals about central points, the lines can be arranged throughout a volume where imagery is produced in three dimensions, in any way where the lines can be illuminated effectively to display angles of imagery changing about common centres simultaneously, or at speeds that appear simultaneous to the eye.

In addition to arrangements of illuminating phosphors or similarly functioning chemicals, parts of lines of illuminating phosphors, or similarly functioning chemicals, or particles of phosphors, or similarly functioning chemicals, acting as light emitting pixels can be arranged throughout a volume where imagery is produced in three dimensions, in any way where the parts of lines or particles can be illuminated effectively to display angles of imagery changing about common centres simultaneously, or at speeds that appear simultaneous to the eye.

The changing planes of imagery producing changing angles of view around a common centre, and thus forming a screen, can rotate, oscillate, pulse, scan, alternate, vary or otherwise appear continuously throughout the volume occupied by the lines of illuminating phosphors or similarly functioning chemicals.

The planes of imagery can change in sequence, clockwise or anti-clock-wise, around a vertical common centre, horizontal common centre, or other common centre to the angles of imagery, whether the centre is positioned within or outside the display or change in any other direction or combination of directions.

In addition, as in vertical or horizontal planes, the planes of imagery can change in both directions at one so as to give horizontal and vertical multiple angles of view and so as to be three-dimensional from all points of view.

The total angle of view presented by all angles produced by each parallel plane of imagery can be any angle required for specific manufacture, broadcasting, transmitting, recording, particular purpose or marketing purpose.

The exterior screen containing the lines of illuminating phosphors or similarly functioning chemicals may be flat, curved, spherical or partially spherical, as may be required.

The illumination of the parallel lines of illuminating phosphors or similarly functioning chemicals can be organised so that recorded, broadcast or transmitted signals on different bandwidths or multiple bandwidths can be accommodated by varying or averaging the signals functions throughout the display.

Such an arrangement particularly applies to high definition television signals where different broadcasting standards may apply and it is desired that a receiver can accommodate one or more standard broadcasting signals. If desired, signals can be coded to control the positioning of imagery or other wise identified for correct positioning within the volume of the display.

Thus, it should be appreciated that, if desired, signals can be coded to control the positioning of imagery, or otherwise identified for correct positioning within the volume of the display.

Signals can be altered for keystone correction if required or changed to be accommodated within the systems controlling and producing displays containing adaptations of the present invention.

In forms of the present invention, the quality of the imagery and the extent to which coherent three-dimensional imagery of objects can be produced as distinct from a sequence of closely aligned but separated and clearly identifiable different angles of view of objects, depends upon the distance of which the imagery is observed; the size of the image; the numbers of the angles of view; the size of the angles of view; the size of the slide, film or video format originating the imagery, and the speed at which the imagery registration is repeated at each position. Further, it depends upon the extent to which the imagery is free of keystone effect, the extent to which the imagery remains stationary and keystone-free for the angle of screen rotation equivalent to the angle of the view projected; the accuracy at which each angle of view is identical in focal length; focus, horizontal and vertical length; horizontal and vertical plane; exposure; grain size or line density; position registration; projector lens size, shape and function; projector operation; screen path repetition and freedom from vibration.

It will be appreciated that one or more projectors are positioned about a so formed screen, the projectors being provided about a common centre in accordance with the present invention.

This form of the invention applies where crystaline, liquid crystal or similarly functioning electro-optical materials produce imagery with multiple angle views changing around common centres simultaneously, or sequentially, at speeds that appear simultaneous to the eyes.

For use in forming a screen surface, the materials may, for example, be inorganic compounds such as galenium arsanide; lithium niobate; potassium dihydrogen phosphate; and balium borate: as well, organic compounds take methyl nitroaniline and nitroaminostilbene: also, materials from electron donors; such as the amino, methoxy and hydroxy groups; and electron acceptor groups; like the nitro, cyanide, ester, and nitroso groups: polymers; polyenes; and polydiacetglenes; or any materials with electro-optical properties; light frequency changing properties; non-centrosymmetric molecular structures; or crystaline structures where anions have been replaced completely by electrons, such as in complex compounds like the alkalide, potassium hexamethyl hexacyclen sodium.

The electro-optical material may be arranged in single pieces at blocks, slabs or chips; in a number of pieces, in large or small pieces of any shape; in films; in thin films; in solutions; in suspensions; sandwiched between other materials, such as glass; as mixtures with other electro-optical compounds; or as mixtures with other materials that are not electro-optical compounds; or in lines.

Where the electro-optical materials are arranged in lines, rods, strips, slats, panels, or filaments, these can be positioned in rows, in partial rows, staggered rows; in parallel; in parallel rows; in parallel in parallel rows; the rows may be horizontal, vertical, or both; intersecting; or different lengths and sizes; and at different positions within the display.

The lines, rods, strips, slats, panels, or filaments of electro-optical materials can be arranged radiating from a centre point; centre line; form grid, matrix, circular, elliptical; or diagonal structures throughout the volume where imagery is produced in three dimensions.

The invention applies where laser lights intersect within a volume to produce controllable colour variations and imagery within the volume.

In particular, the invention applies where the laser light emission sources are relatively small and can be arranged in number around displays so as to produce intersecting lines of laser light throughout the volume of the display.

The lines of laser light, and the point at which intersections occur, would be too small to be resolved by the eyes at the normal viewing distance; so that imagery in the display would appear solid, and three-dimensional where intersections of laser lights contained multiple angle views around common centres.

The invention applies where imagery containing multiple angle views around common centres is projected onto screening surfaces that produce multiple angle views around common centres.

The imagery is produced on the screening surface, or surfaces, as it, or they, traverse the space in which the imagery is illuminated; so that all angles of view appear clearly; changing position with sufficient speed to ensure that different angles of view appear to persist throughout the imagery; so that at all times, objects appear in proportional, actual, or appropriate height, width, and depth and at more than one aspect, unless at visual infinity.

The projection may be controlled for correct positioning on the screening surfaces; and for keystone correction.

Corrected imagery projection may be produced through synchronisation between projection and screening systems; by operating the projection and screening systems at fixed speeds; or by combinations of both approaches.

Projection may be from the front, or from behind, the viewing position.

In the case of cinemas, the components of screening surfaces may be separated at relatively far larger distances; and take up far greater volumes than smaller displays in order to produce multiple angles of view appropriate to the viewing distances of cinema theatres and the greater distance at which individual screening components can be resolved by the eyes of audience.

It will be appreciated that the present invention has been described by way of example only and with reference to the accompanying drawings, and that improvements and modifications may be made to the invention without departing from the scope or spirit thereof.

I claim:

1. A method for creating three dimensional imagery on at least one screen surface, said at least one screen surface being rotated about a common center and about at least one horizontal or vertical axis to form a plurality of changing planes of imagery, the method comprising: projecting at least one image at a screen surface of said at least one screen surface from at least one projector spaced apart from said screen surface, said projecting of said at least one image being without modulation or reflection of said at least one image between said at least one projector and said screen surface, said at least one projector originating said at least one image, at least one of said at least one projector being mounted about a common center at a preselected fixed focal length from said screen surface, such that said at least one image is displayed on said screen surface at angles substantially corresponding to angles at which said plurality of changing planes of imagery are located; wherein said plurality of changing planes of imagery change at such a speed and said at least one image is so projected that said at least one image appears simultaneously and in three dimensions to an observer.

2. A method according to claim 1, wherein multiple projectors are spaced apart from a common center of said at least one image and project multiple images at said screen surface from determined angles relative to said common center of said at least one image.

3. A method according to claim 1, wherein said at least one image displayed on said screen surface at said angles are projected onto said screen surface, said screen surface being formed by changing planes by a projector located at a preselected focal length from and relative to said screen surface.

4. A method according to claim 2 or 3, wherein said at least one image appears to have volume in space to an eye of an observer.

5. A method according to claim 4, wherein said at least one screen surface and said at least one projector rotate in synchronization with movement of said at least one screen surface about said at least one horizontal or vertical axis.

6. A method according to claim 5, wherein a plurality of projectors are mounted about and relative to said at least one screen surface at predetermined angles relative thereto and about a common center, and wherein the projectors are pulsed or shuttered as said at least one screen surface rotates, forming a plurality of changing planes of imagery such that said at least one image appears to said eye simultaneously in three dimensional form.

7. A method according to claim 6, wherein said at least one screen surface is formed at a point where projected light forms said changing planes of imagery.

* * * * *